United States Patent
Tanaka et al.

(10) Patent No.: US 10,457,202 B2
(45) Date of Patent: Oct. 29, 2019

(54) VEHICLE CABIN INTERIOR LIGHTING DEVICE

(71) Applicant: TOYOTA JIDOSHA KABUSHIKI KAISHA, Toyota-shi (JP)

(72) Inventors: Ken Tanaka, Togo-cho (JP); Kenji Narumi, Komaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/177,777

(22) Filed: Nov. 1, 2018

(65) Prior Publication Data

US 2019/0193630 A1     Jun. 27, 2019

(30) Foreign Application Priority Data

Dec. 26, 2017 (JP) ................... 2017-250020

(51) Int. Cl.
*B60Q 3/12* (2017.01)
*B60Q 3/78* (2017.01)
*B60Q 3/64* (2017.01)

(52) U.S. Cl.
CPC ............... *B60Q 3/12* (2017.02); *B60Q 3/64* (2017.02); *B60Q 3/78* (2017.02); *B60K 2370/33* (2019.05)

(58) Field of Classification Search
CPC .. B60Q 3/10–18; B60Q 3/78; B60K 2370/33; G02B 5/30–3075
See application file for complete search history.

(56) References Cited

U.S. PATENT DOCUMENTS

| | | | | |
|---|---|---|---|---|
| 4,973,132 A | * | 11/1990 | McDonald | G02B 5/3066 359/13 |
| 5,510,913 A | * | 4/1996 | Hashimoto | G02B 27/01 349/11 |
| 2006/0034092 A1 | | 2/2006 | Okazaki et al. | |
| 2011/0182081 A1 | * | 7/2011 | Oeuvrard | B60Q 3/14 362/488 |
| 2013/0279016 A1 | * | 10/2013 | Finger | G02B 5/30 359/630 |
| 2017/0184844 A1 | * | 6/2017 | Matsushita | G02B 5/30 |

FOREIGN PATENT DOCUMENTS

| | | |
|---|---|---|
| JP | 02141720 A * | 5/1990 |
| JP | 2002-182196 | 6/2002 |
| JP | 2006-208606 | 8/2006 |
| JP | 2009-080321 | 4/2009 |
| JP | 2009-184668 | 8/2009 |
| JP | 2009-248846 | 10/2009 |
| JP | 2017-061220 | 3/2017 |

* cited by examiner

*Primary Examiner* — Mariceli Santiago
(74) *Attorney, Agent, or Firm* — Oblon, McClelland, Maier & Neustadt, L.L.P.

(57) ABSTRACT

There is provided a vehicle cabin interior lighting device including: a light source that emits light; a polarizing member that converts the emitted light into p-polarized light; and a projection portion that is provided at an upper portion of an instrument panel, and onto which the p-polarized light is projected, and that reflects the projected p-polarized light without changing its polarization characteristics, and that causes the projected p-polarized light to be incident on a front windshield glass at Brewster's angle.

4 Claims, 5 Drawing Sheets

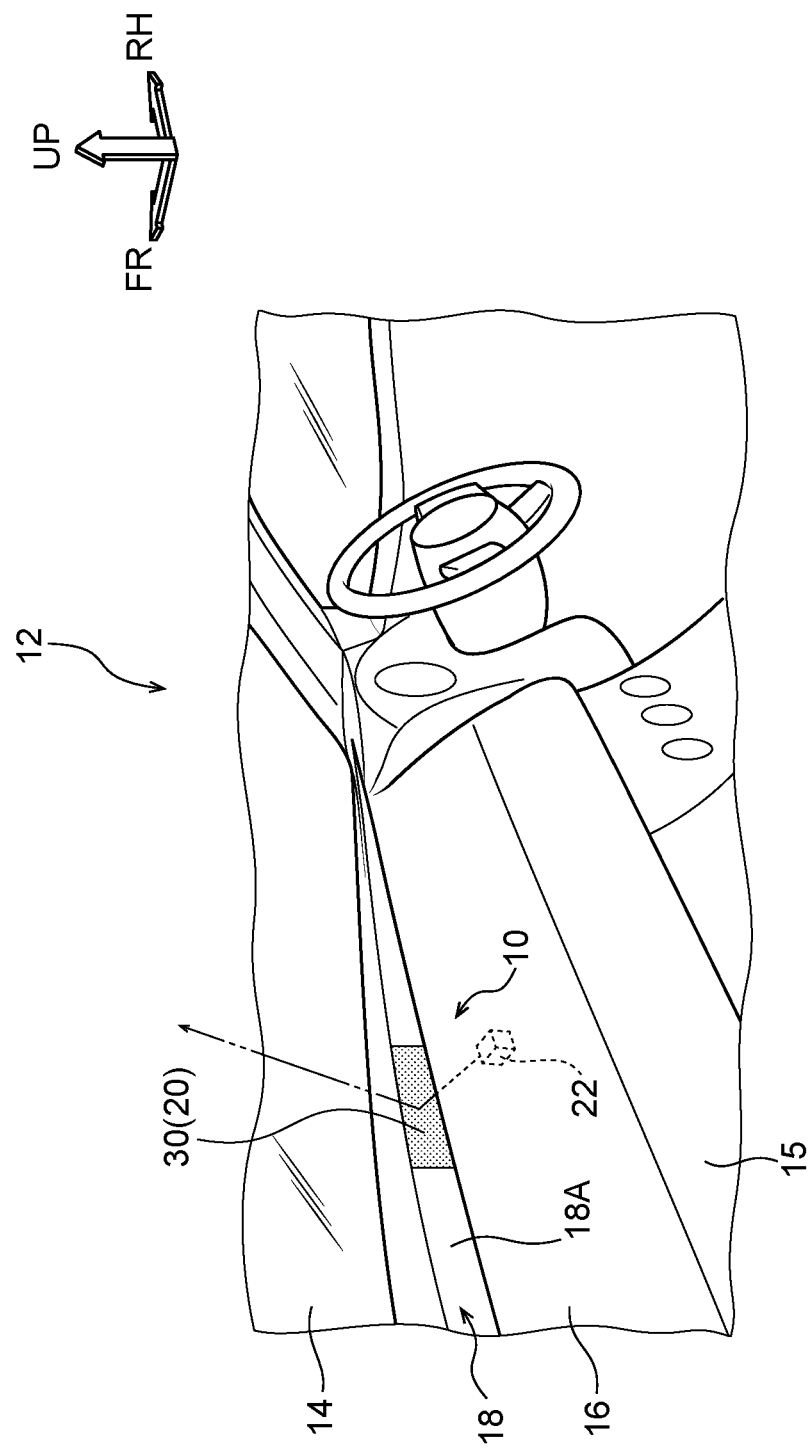

VEHICLE CABIN INTERIOR LIGHTING DEVICE

CROSS-REFERENCE TO RELATED APPLICATION

This application is based on and claims priority under 35 USC 119 from Japanese Patent Application No. 2017-250020 filed on Dec. 26, 2017, the disclosure of which is incorporated by reference herein.

BACKGROUND

Technical Field

The present disclosure relates to a vehicle cabin interior lighting device.

Related Art

There has conventionally been proposed a structure in which a display portion, which is in the form of a vertical wall surface, is provided at the distal end portion of the vehicle front side of an instrument panel, and, in order to prevent information that is projected-out onto the display portion from being reflected in the front windshield glass, an overhang portion that extends toward the vehicle cabin inner side is formed at the upper portion of the display portion (see, for example, Japanese Patent Application Laid-Open (JP-A) No. 2017-61220).

Further, there has also conventionally been proposed a structure in which light that is emitted from a liquid crystal display provided within a vehicle cabin is made to become only p-polarized light, and this light is made incident on the front windshield glass at Brewster's angle, and is prevented from being reflected in the front windshield glass (see, for example, JP-A No. 2002-182196).

However, when an overhang portion that extends toward the vehicle cabin inner side is formed at the upper portion of a display portion that is provided at the distal end portion of the vehicle front side of an instrument panel, the overhang portion results in constraints on the design. Further, providing a liquid crystal display within a vehicle cabin such that the emitted light is incident on the front windshield glass at Brewster's angle also results in constraints on the design.

SUMMARY

Thus, the present disclosure provides a vehicle cabin interior lighting device that can suppress the reflecting of light in a front windshield glass while reducing constraints on design.

In order to achieve the above-described object, a vehicle cabin interior lighting device of a first aspect of the present disclosure includes: a light source that emits light; a polarizing member that converts the emitted light into p-polarized light; and a projection portion that is provided at an upper portion of an instrument panel, and onto which the p-polarized light is projected, and that reflects the projected p-polarized light without changing its polarization characteristics, and that causes the projected p-polarized light to be incident on a front windshield glass at Brewster's angle.

In accordance with the first aspect of the present disclosure, the light that has been emitted from the light source is converted into p-polarized light by the polarizing member. The light, that has been converted into p-polarized light, is projected onto the projection portion that is provided at an upper portion of the instrument panel. Then, the projection portion reflects the light that has been projected thereon, without changing the polarization characteristics of the projected light (i.e., reflects the p-polarized light as is), and causes the light to be incident on the front windshield glass at Brewster's angle.

Accordingly, constraints on the design are reduced and reflecting of light in the front windshield glass is suppressed as compared with a structure in which an overhang portion that extends toward the vehicle cabin inner side is formed at the upper portion of a display portion provided at the instrument panel, or a structure in which a liquid crystal display is provided within the vehicle cabin such that the emitted light is incident on the front windshield glass at Brewster's angle. Note that "Brewster's angle" in the present disclosure includes not only exactly Brewster's angle, but also includes substantially Brewster's angles that have slight errors.

A vehicle cabin interior lighting device of a second aspect of the present disclosure is the vehicle cabin interior lighting device of the first aspect, wherein the polarizing member is disposed in proximity to the light source.

In accordance with the second aspect of the present disclosure, the polarizing member is disposed in proximity to the light source. Accordingly, the surface area of the polarizing member is reduced and compactness of the vehicle cabin interior lighting device is devised, as compared with a structure in which the polarizing member is disposed away from the light source.

A vehicle cabin interior lighting device of a third aspect of the present disclosure is the vehicle cabin interior lighting device of the first or second aspect, wherein the projection portion is made to be a portion of a vertical wall portion that is formed so as to extend in a vehicle transverse direction at the upper portion of the instrument panel.

In accordance with the third aspect, the projection portion is made to be a portion of a vertical wall portion that is formed so as to extend in the vehicle transverse direction at the upper portion of the instrument panel. Accordingly, the structure of the vehicle cabin interior lighting device is simplified as compared with a case in which the projection portion is not made to be a portion of the vertical wall portion of the instrument panel.

Further, a vehicle cabin interior lighting device of a fourth aspect of the present disclosure is the vehicle cabin interior lighting device of the first or second aspect, wherein the projection portion is made to be a screen that is provided at a vertical wall portion that is formed so as to extend in a vehicle transverse direction at the upper portion of the instrument panel.

In accordance with the fourth aspect, the projection portion is made to be a screen that is provided at a vertical wall portion that is formed so as to extend in the vehicle transverse direction at the upper portion of the instrument panel. Accordingly, the projected light can be projected-out more clearly as compared with a case in which the projection portion is not made to be a screen that is provided at the vertical wall portion of the instrument panel.

In accordance with the first aspect of the present disclosure, the reflecting of light in a front windshield glass can be suppressed while constraints on design are reduced.

In accordance with the second aspect of the present disclosure, the surface area of the polarizing member can be reduced, and compactness of the vehicle cabin interior lighting device can be devised.

In accordance with the third aspect of the present disclosure, the structure of the vehicle cabin interior lighting device can be simplified.

In accordance with the fourth aspect of the present disclosure, projected light can be projected-out more clearly.

BRIEF DESCRIPTION OF THE DRAWINGS

Exemplary embodiments of the present disclosure will be described in detail based on the following figures, wherein:

FIG. 5 is a perspective view showing the instrument panel of the vehicle provided with a modified example of the vehicle cabin interior lighting device relating to the present embodiment.

DETAILED DESCRIPTION

An embodiment relating to the present disclosure is described in detail hereinafter on the basis of the drawings. Note that, for convenience of explanation, arrow UP that is shown appropriately in the respective drawings is the vehicle upward direction, arrow FR is the vehicle frontward direction, and arrow RH is the vehicle rightward direction. Accordingly, in the following description, when vertical, longitudinal and left-right directions are used without being specified, they refer to the vertical of the vehicle vertical direction, the longitudinal of the vehicle longitudinal direction, and the left and the right of the vehicle left-right direction (the vehicle transverse direction).

Figure 1:
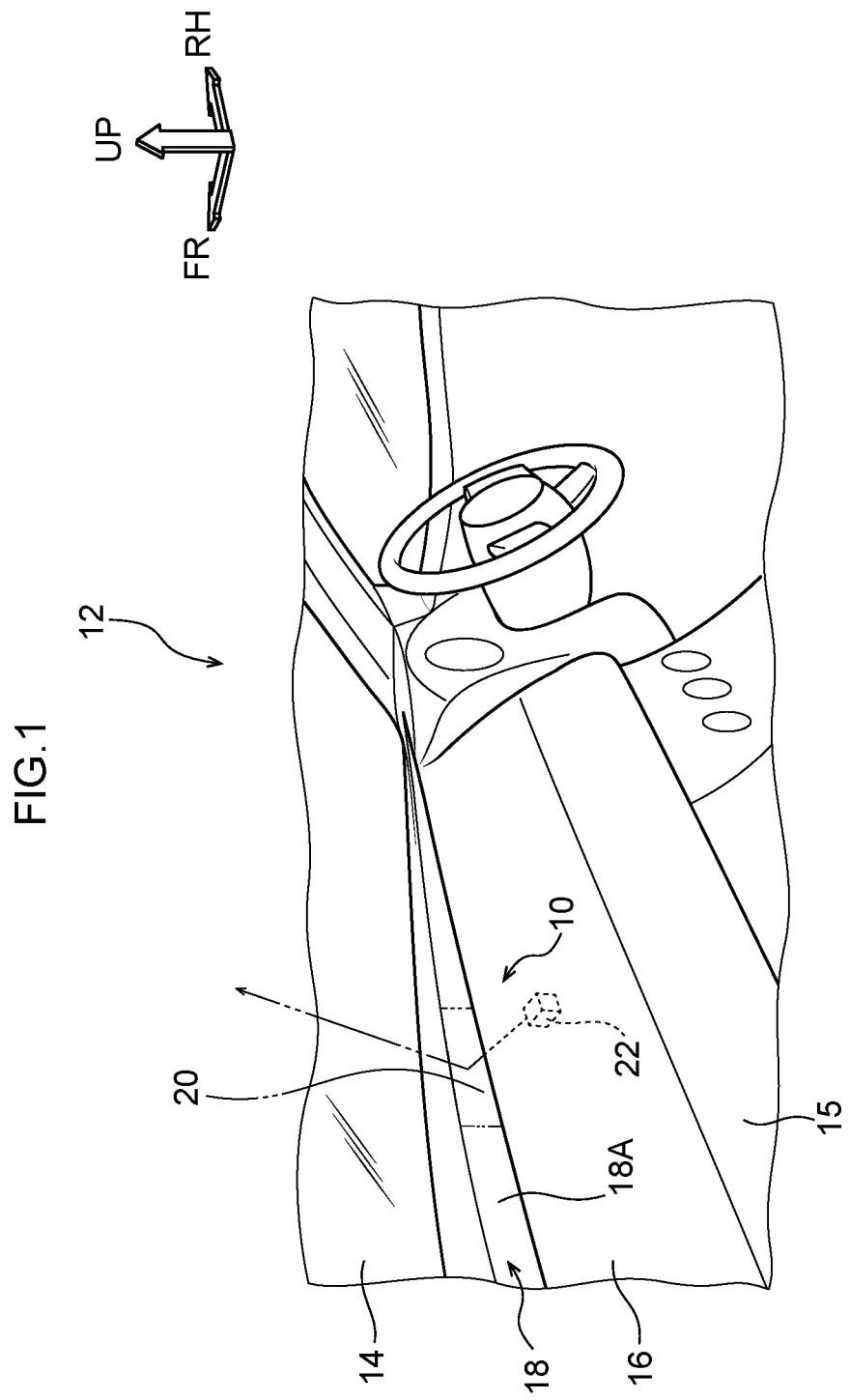
FIG. 1 is a perspective view showing an instrument panel of a vehicle that is provided with a vehicle cabin interior lighting device relating to a present embodiment.

As shown in FIG. 1, a vehicle cabin interior lighting device 10 relating to the present embodiment is provided at the upper portion (hereinafter called "instrument panel upper 16") of an instrument panel 15 that is made of resin and faces, in the vehicle vertical direction, a front windshield glass (hereinafter called "front glass") 14 of the vehicle 12.

Figure 2:
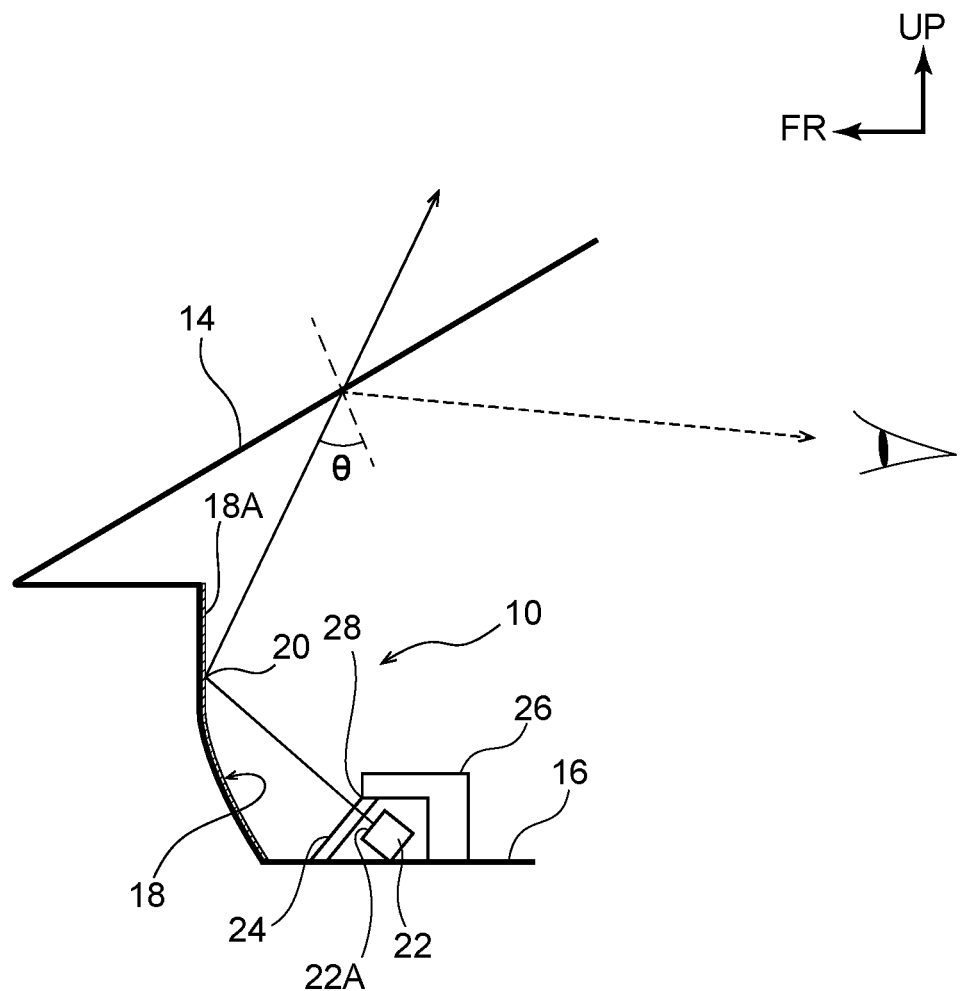
FIG. 2 is a schematic drawing showing the structure of the vehicle cabin interior lighting device relating to the present embodiment, as seen from the vehicle transverse direction.

In detail, as shown in FIG. 1 and FIG. 2, a vertical wall portion 18 that extends in the vehicle transverse direction is formed integrally with the instrument panel upper 16. A wall surface 18A, which faces the vehicle cabin inner side, of the vertical wall portion 18 is a flat surface. The vehicle cabin interior lighting device 10 has a light source 22 such as a light-emitting diode (LED) or the like that emits light. This light source 22 is disposed further toward the vehicle cabin inner side than and further toward the lower side than the vertical wall portion 18.

Namely, the light source 22 is disposed at the instrument panel upper 16 at further toward the vehicle cabin inner side than the vertical wall portion 18, so as to illuminate light onto a projection portion 20 that is described later and that is a portion of the wall surface 18A of the vertical wall portion 18. Note that, as shown in FIG. 2, a cover member 26 that covers the light source 22 is provided at the instrument panel upper 16 so as to make it difficult to see the light source 22 through the front glass 14 from the exterior of the vehicle 12. An opening portion 28 is formed in the cover member 26. The light that is emitted from the light source 22 is illuminated through this opening portion 28.

Figure 3:
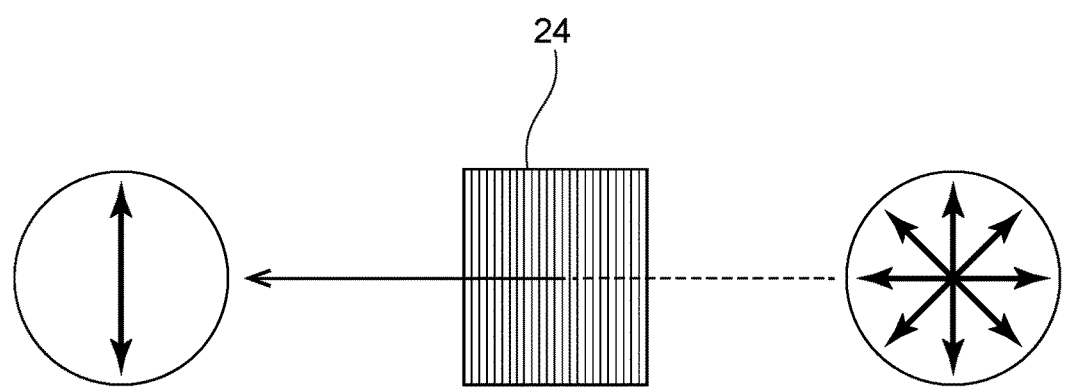
FIG. 3 is a schematic drawing showing a polarizing film of the vehicle cabin interior lighting device relating to the present embodiment.

The vehicle cabin interior lighting device 10 has a polarizing film (p-polarizing plate) 24 that serves as a polarizing member and converts the light emitted from the light source 22 into p-polarized light. The polarizing film 24 is mounted (see FIG. 2) to the cover member 26 (the instrument panel upper 16) so as to block the opening portion 28 such that, of the light emitted from the light source 22, only the p-polarized light is transmitted therethrough as shown in FIG. 3. Namely, the polarizing film 24 is disposed near an emitting surface 22A of the light source 22.

As shown in FIG. 1 and FIG. 2, the vehicle cabin interior lighting device 10 has the projection portion 20 onto which the light, which has been converted into p-polarized light, is projected, and that reflects the projected light without changing the polarization characteristics thereof (i.e., reflects the light as p-polarized light as is), and that causes the light to be incident onto the front glass 14 substantially at Brewster's angle θ. The projection portion 20 is made to be a portion (a predetermined region) of the wall surface 18A of the vertical wall portion 18, and functions as ambient lighting (lighting of one or plural colors) at night for example.

Note that the projection portion 20 is not limited to a structure that functions as ambient lighting. For example, by making the light source 22 be a projector or the like, the projection portion 20 may be structured so as to display information as characters or images that caution the driver (including the passengers during automatic driving), or display patterns such as arrows or the like in conjunction with the turn signals.

Further, the projection portion 20 may be structured by at least the instrument panel upper 16 being molded of a resin material (equivalent to that of a screen 30 that is described later) that can reflect projected light without changing the polarization characteristics thereof, or by such a resin material being coated at least on the wall surface 18A of the vertical wall portion 18. Further, by setting the angle of illumination of the light source 22 onto the projection portion 20 appropriately, the p-polarized light that is reflected by the projection portion 20 is made incident onto the front glass 14 substantially at Brewster's angle θ.

Figure 4:
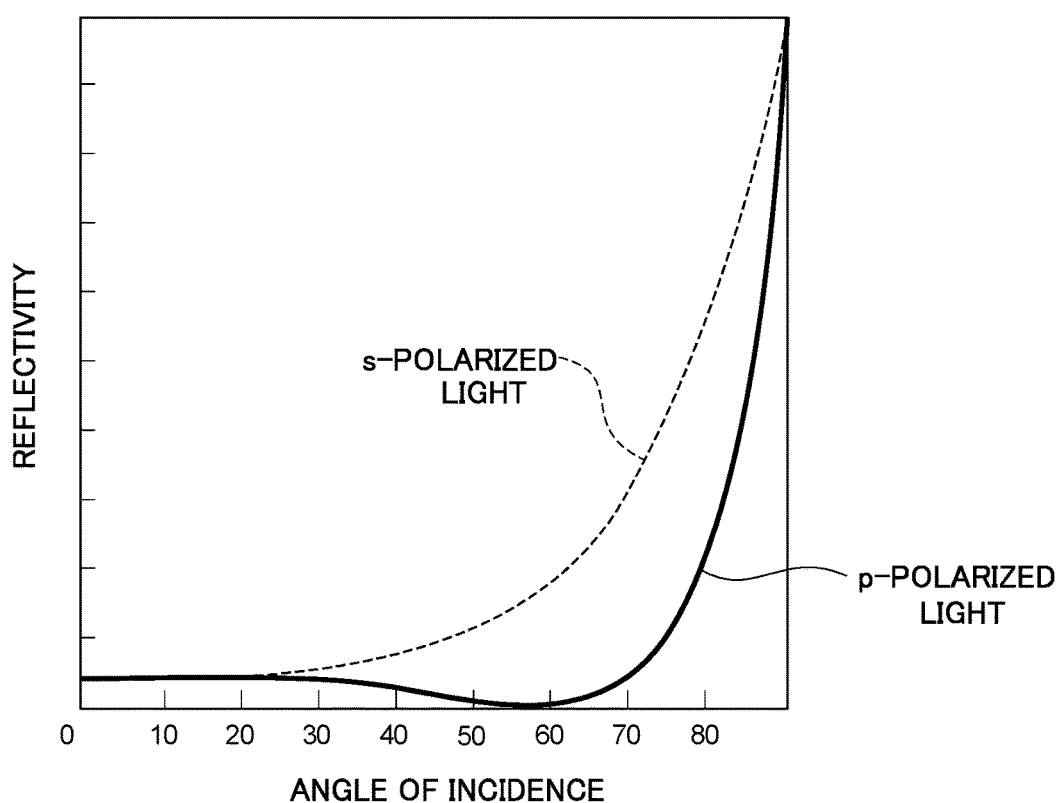
FIG. 4 is a graph showing an example of Brewster's angle in the vehicle cabin interior lighting device relating to the present embodiment.

Here, as shown in FIG. 4, the greater the angle of incidence of s-polarized light onto the front glass 14, the greater the reflectivity thereof. On the other hand, with p-polarized light, the greater the angle of incidence thereof onto the front glass 14, the lower the reflectivity thereof. When p-polarized light is incident at a fixed angle of incidence that is determined in accordance with the refractive index of the reflection interface, the reflectivity of the p-polarized light is 0 (zero) which is the minimum value.

This fixed angle of incidence is Brewster's angle (polarization angle), and is an angle determined by arctan N, where N is the refractive index of the front glass 14. In the present embodiment, because the refractive index N of the front glass 14 is 1.5, Brewster's angle is 56.3° Note that, if the angle of incidence of the p-polarized light onto the front glass 14 becomes greater than Brewster's angle, the reflectivity thereof becomes greater again (refer to FIG. 4).

Operation of the vehicle cabin interior lighting device 10 that is structured as described above is described next.

As shown in FIG. 2, the light that is emitted from the light source 22 is, by being transmitted through the polarizing film 24 that is disposed near the emitting surface 22A of the light source 22, made into light that is only p-polarized light. When the polarizing film 24 is placed near the emitting surface 22A of the light source 22 in this way, as compared with a structure in which the polarizing film 24 is disposed away from the light source 22, the surface area of the polarizing film 24 can be reduced, and compactness of the vehicle cabin interior lighting device 10 can be devised.

Further, the light, that has been made into only p-polarized light by the polarizing film 24, is illuminated onto the projection portion 20 that is a portion of the wall surface 18A of the vertical wall portion 18 that is formed at the instrument panel upper 16. Due thereto, the projection portion 20 is either utilized for ambient lighting at night, or is utilized as an information displaying means for the driver. Note that, when the projection portion 20 is made to be a portion of the wall surface 18A of the vertical wall portion 18, the structure of the vehicle cabin interior lighting device 10 can be simplified as compared with a case in which the projection portion 20 is not a portion of the wall surface 18A.

Further, the p-polarized light that is illuminated onto the projection portion 20 is reflected by the projection portion 20 without the polarization characteristics thereof being changed (i.e., is reflected as is as p-polarized light). The reflected p-polarized light is incident on the front glass 14, and the angle of incidence thereof at this time is substantially Brewster's angle θ. Accordingly, almost all of the p-polarized light that is incident on the front glass 14 is transmitted through the front glass 14, and reflection thereof by the front glass 14 is suppressed or prevented.

Namely, the light that is projected onto the projection portion 20 being reflected in the front glass 14 is suppressed or prevented. Accordingly, external information, which is obtained by the driver looking through the front glass 14, being reduced due to reflection of the projection portion 20 can be suppressed or prevented.

Further, constraints on the design can be reduced as compared with a structure in which an overhang portion (not illustrated), which extends toward the vehicle cabin inner side, is formed at the upper end portion of the projection portion 20, or a structure in which a liquid crystal display (not illustrated) or the like is provided within the vehicle cabin such that the emitted light is incident on the front glass 14 at substantially Brewster's angle θ.

Note that the projection portion 20 is not limited to being structured by a portion of the wall surface 18A of the vertical wall portion 18 that is formed at the instrument panel upper 16. The projection portion 20 may be structured by a decorative portion or a plated portion (neither of which is illustrated) that is provided integrally with the wall surface 18A. It is good for a decorative portion in particular to be formed by a resin material or a fabric or the like (that is equivalent to that of the screen 30 that is described later) that can reflect the projected light without changing the polarization characteristics thereof, or for such a resin material to be formed as a film and molded integrally with or affixed to the wall surface 18A or the like.

Moreover, as shown in FIG. 5, the projection portion 20 may be structured by providing the screen 30, which is white and is shaped as a flat surface and which reflects the projected light without changing the polarization characteristics thereof, at a portion of the wall surface 18A of the vertical wall portion 18. Although the type of the screen 30 is not particularly limited, a diffusion type screen that is used in theaters and the like can be used therefor. By making the projection portion 20 be the screen 30 in this way, the projected light or information can be projected-out more clearly than in a case in which the projection portion 20 is not made to be the screen 30.

The vehicle cabin interior lighting device 10 relating to the present embodiment has been described above on the basis of the drawings. However, the vehicle cabin interior lighting device 10 is not limited to the illustrated structure, and the design thereof can be changed appropriately within a scope that does not depart from the gist of the present disclosure. For example, the light source 22 is not limited to an LED or a projector, and may be a light guide rod (not illustrated) or the like.

Further, the one light source 22 (polarizing film 24) and the one projection portion 20 are illustrated in FIG. 1 and FIG. 4, but the numbers of the light sources 22 and the projection portions 20 are not limited to one as illustrated. Plural light sources 22 and plural projection portions 20 may be provided at a predetermined interval in the vehicle transverse direction at the wall surface 18A of the vertical wall portion 18 that extends in the vehicle transverse direction.

What is claimed is:

1. A vehicle cabin interior lighting device comprising:
    a light source that emits light;
    a polarizing member that converts the emitted light into p-polarized light; and
    a projection portion that is provided at an upper portion of an instrument panel, and onto which the p-polarized light is projected, and that reflects the projected p-polarized light without changing its polarization characteristics, and that causes the projected p-polarized light to be incident on a front windshield glass at Brewster's angle.

2. The vehicle cabin interior lighting device of claim 1, wherein the polarizing member is disposed in proximity to the light source.

3. The vehicle cabin interior lighting device of claim 1, wherein the projection portion is made to be a portion of a vertical wall portion that is formed so as to extend in a vehicle transverse direction at the upper portion of the instrument panel.

4. The vehicle cabin interior lighting device of claim 1, wherein the projection portion is made to be a screen that is provided at a vertical wall portion that is formed so as to extend in a vehicle transverse direction at the upper portion of the instrument panel.

* * * * *